United States Patent
Rydström (10) Patent No.: US 11,692,815 B2
(45) Date of Patent: Jul. 4, 2023

(54) IMAGING SYSTEM WITH CALIBRATION TARGET OBJECT

(71) Applicant: SICK IVP AB, Linköping (SE)

(72) Inventor: Daniel Rydström, Linköping (SE)

(73) Assignee: SICK IVP AB, Linköping (SE)

( * ) Notice: Subject to any disclaimer, the term of this patent is extended or adjusted under 35 U.S.C. 154(b) by 268 days.

(21) Appl. No.: 17/147,013

(22) Filed: Jan. 12, 2021

(65) Prior Publication Data

US 2021/0215475 A1   Jul. 15, 2021

(30) Foreign Application Priority Data

Jan. 15, 2020   (EP) .................................... 20152021

(51) Int. Cl.
   *G01B 11/25*   (2006.01)
   *G06T 7/80*   (2017.01)
(52) U.S. Cl.
   CPC ...... *G01B 11/2504* (2013.01); *G01B 11/2545* (2013.01); *G06T 7/80* (2017.01)
(58) Field of Classification Search
   CPC ... G01B 11/24; G01B 11/2504; G01B 11/002; G01B 11/25; G01B 21/042; G01B 11/2513; G01B 11/2545; G01B 11/00; G01B 11/245; G01B 11/22; G01B 11/14; G01B 2290/70; G01B 9/02072; G01B 11/0675; G01B 2210/56; G01B 9/02007; G01B 9/02032; G01B 9/0209; G01B 11/02; G01B 9/0203; G01B 9/02091;
   (Continued)

(56) References Cited

U.S. PATENT DOCUMENTS

| | | |
|---|---|---|
| 2005/0013371 A1 | 6/2005 | Miyamoto et al. |
| 2006/0268285 A1 | 11/2006 | Karabassi et al. |
| | (Continued) | |

FOREIGN PATENT DOCUMENTS

| | | | | |
|---|---|---|---|---|
| CN | 105841618 A | * | 8/2016 | ............ G01B 11/00 |
| DE | 102012012156 A1 | * | 12/2013 | ............ G01B 11/02 |
| | (Continued) | | | |

OTHER PUBLICATIONS

European Patent Office Search Report for EP 20152021.0 dated Jul. 6, 2020.

(Continued)

*Primary Examiner* — Michael P Stafira
(74) *Attorney, Agent, or Firm* — Renner, Otto, Boisselle & Sklar, LLP (57) ABSTRACT

Imaging system based on light triangulation for capturing information on three dimensional characteristics of an object by means of one or more cameras. A calibration target object is within respective field of view of said cameras so that the cameras are able to detect light reflected from a surface structure of the calibration target object comprising one or more regular right pyramidal recesses and one or more regular right pyramids, with their respective bases in the same plane and their respective apexes at the same orthogonal distance from that same plane. The base of at least one of said regular right pyramidal recesses shares at least one side with the base of at least one of said regular right pyramids, such that each pair of lateral faces sharing side are located in a common plane.

8 Claims, 8 Drawing Sheets

(58) Field of Classification Search
CPC ........................ G01B 9/02004; G01B 11/2518;
G01B 11/06; G01B 11/2527; G01B
11/005; G01B 11/026; G01B 11/2433;
G01B 11/0608; G01B 11/03; G01B
11/0625; G01B 11/0683; G01B 11/16;
G01B 11/2425; G01B 11/2441; G01B
5/0014; G01B 11/164; G01B 11/26;
G01B 11/2755; G01B 2210/143; G01B
11/028; G01B 11/0616; G01B 11/0641;
G01B 11/2522; G01B 11/275; G01B
2210/12; G01B 2210/28; G01B 5/008;
G01B 11/007; G01B 11/08; G01B
11/2531; G01B 11/2536; G01B 11/254;
G01B 11/272; G01B 11/30; G01B
11/303; G01B 21/045; G01B 2210/14;
G01B 2210/26; G01B 2210/30; G01B
2210/303; G01B 2290/65; G01B 3/30;
G01B 9/04
See application file for complete search history.

(56) References Cited

U.S. PATENT DOCUMENTS

| 2010/0141776 | A1 | 6/2010 | Ban et al. |
| 2018/0012052 | A1 | 1/2018 | Wang et al. |
| 2018/0313644 | A1 | 11/2018 | Glinec |
| 2018/0372481 | A1* | 12/2018 | Stigwall ............... G01B 11/005 |

FOREIGN PATENT DOCUMENTS

| EP | 1524494 A1 * | 4/2005 | ......... G01B 11/2504 |
| EP | 3470778 A1 * | 4/2019 | ........... G01B 11/245 |
| GB | 2084721 A * | 4/1982 | ........... G01B 11/022 |
| JP | 2001295089 | 10/2001 | |
| JP | 2010139329 A | 6/2010 | |
| JP | 2013069693 A | 4/2013 | |
| JP | 2014018932 A * | 2/2014 | |
| JP | 2014018932 A | 2/2014 | |
| JP | 2017015440 A | 1/2017 | |
| JP | 2009036589 A | 2/2019 | |
| KR | 20100040144 A * | 4/2010 | |
| WO | WO-2005059469 A1 * | 6/2005 | ............. G01B 11/02 |
| WO | 2014115868 | 7/2014 | |
| WO | WO-2017070928 A1 * | 5/2017 | ............. A61C 9/006 |

OTHER PUBLICATIONS

Notice of Reasons of Refusal dated Dec. 6, 2021 in corresponding Japanese Patent Application No. 2021004084 and English translation.

* cited by examiner

IMAGING SYSTEM WITH CALIBRATION TARGET OBJECT

TECHNICAL FIELD

Embodiments herein concern a an imaging system based on light triangulation, which system comprises a calibration target object for calibration of the imaging system.

BACKGROUND

Industrial vision cameras and systems for factory and logistic automation may be based on three-dimensional (3D) machine vision, where 3D-images of a scene and/or object are captured. By 3D-images is referred to images that comprise also "height", or "depth", information and not, or at least not only, information, e.g. intensity and/or color, regarding pixels in only two-dimensions (2D) as in a conventional image. That is, each pixel of the image may comprise such information associated with the position of the pixel in the image and that maps to a position of what has been imaged, e.g. the object. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time. A special case of line scan image is image data provided by so called "sheet of light", e.g. laser-line, 3D triangulation. Laser is often preferred but also other light sources able to provide the "sheet of light" can be used, e.g. light sources able to provide light that stays focused and do not spread out to much, such as light provided by a Light Emitting Diode (LED).

3D machine vision systems are often based on such sheet of light triangulation. In such a system there is a light source illuminating the object with a specific light pattern, such as the sheet of light as the specific light pattern, e.g. resulting in a light, or laser, line on the object and along which line 3D characteristics of the object can be captured, corresponding to a profile of the object. The light used is sometimes referred to as structured light. By scanning the object with such a line, i.e. performing a line scan, 3D characteristics of the whole object can be captured, corresponding to multiple profiles.

3D machine vision systems or devices that use a sheet of light for triangulation may be referred to as systems or devices for 3D imaging based on light, or sheet of light, triangulation, or simply laser triangulation when laser light is used.

Typically, to produce a 3D-image based on light triangulation, reflected light from an object to be imaged is captured by an image sensor of a camera and intensity peaks are detected in the image data. The peaks occur at positions corresponding to locations on the imaged object with the incident light, e.g. corresponding to a laser line, that was reflected from the object. The position in the image of a detected peak will map to a position on the object from where the light resulting in the peak was reflected.

A laser triangulating camera system, i.e. an imaging system based on light triangulation, projects a laser line onto a target object to create height curves from the surface of the target object. By moving the target object relative to the cameras and light sources involved, information on height curves from different parts of the target object can be captured by images and then combined and used to produce a three dimensional representation of the target object.

Conventionally, image sensor calibration is performed that corrects for measurements errors within the laser plane and include e.g. lens distortions and perspective effects. When these errors have been corrected, e.g. skewing distortions introduced by the placement of the light source(s) may be corrected as well. The coordinate systems are typically also aligned to some reference during calibration.

The calibration of an imaging system based on light triangulation e.g. involves finding relations to be able to transform image sensor data in image sensor coordinates to real world coordinates. In other words, the calibration e.g. strives to provide a relation between sensor metrics and coordinates, and real world metrics, e.g. standard metric units, and real world coordinates.

Relations from calibration typically need to be established each time the camera(s) and light source(s) are setup or changed, e.g. changes in position relative each other, changes in field of view, etc. In other words, calibration is done after or in connection with setup of the imaging system and before it is used in normal operation.

During the calibration, a calibration target object with predetermined and known properties, e.g. geometries, and dimensions is imaged and utilized to establish said relations. The established relations are then used, e.g. are used to configure the imaging system, so that when a target object is imaged by the imaging system during normal operation, a better and more correct 3D representation of the object is enabled and can be provided, and that is in accordance with the object's actual and real dimensions.

A first part of the calibration is for example object identification where it is found out where planar surfaces occur in the scan, i.e. in image data of the calibration target object. It is estimated plane equations for these surfaces and the planes are matched to a model of the calibration target object with known dimensions an geometries.

It is preferred to be able to use a single calibration object for all or as many calibration actions and situations an imaging system can be used with. For example for as many different setups, e.g. camera and light source configurations and relations, as possible and for each be able to e.g. figure out skewing distortions and/or accomplish aligning to a reference coordinate system.

Different kinds of calibrations object for purposes as or similar as above have been proposed in the prior art.

US 2018012052 A1 discloses a method and calibration object that can be used for a for opposing camera alignment, i.e. a setup with two cameras opposing each other and imaging an object from two opposite directions.

SUMMARY

In view of the above an object is to provide one or more improvements or alternatives to the prior art, such as providing an imaging system based on light triangulation for capturing information on 3D characteristics of a target object with an improved or alternate calibration object, that facilitate and/or support calibration of the imaging system.

The object is achieved by an imaging system based on light triangulation for capturing information on three dimensional characteristics of target objects by means of one or more cameras arranged at first one or more positions for detecting light reflected from said target objects. The imaging system comprises said one or more cameras at said first positions and a calibration target object within respective field of view of said cameras so that the cameras are able to detect light reflected from one or more surface structures of the calibration target object. Said one or more surface structures having a first surface structure comprising one or more regular right pyramidal recesses and one or more regular right pyramids, with their respective bases in the same plane and their respective apexes at the same orthogonal distance from that same plane. The lateral faces of the respective regular right pyramids correspond to the lateral faces of the regular right pyramidal recesses. There being at least three regular right pyramids or at least three regular right pyramidal recesses, wherein the base of at least one of said regular right pyramidal recesses shares at least one side with the base of at least one of said regular right pyramids, such that each pair of lateral faces sharing side are located in a common plane.

Each pair of lateral faces sharing side will thus appear as a single surface in a common plane and which surface in one end converges into the apex of a regular right pyramidal recess, and in the other, opposite, end converges into the apex of a regular right pyramid. There will thus be a single surface that is relatively large, easy to detect and can be used to two find two apexes. Calibration of the imaging system is thereby facilitated and efficient calibration enabled. Hence, it has been provided an imaging system based on light triangulation with a calibration target object that facilitates and/or support calibration of the imaging system.

BRIEF DESCRIPTION OF THE DRAWINGS

Examples of embodiments herein are described in more detail with reference to the appended schematic drawings, which are briefly described in the following.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Figure 1:
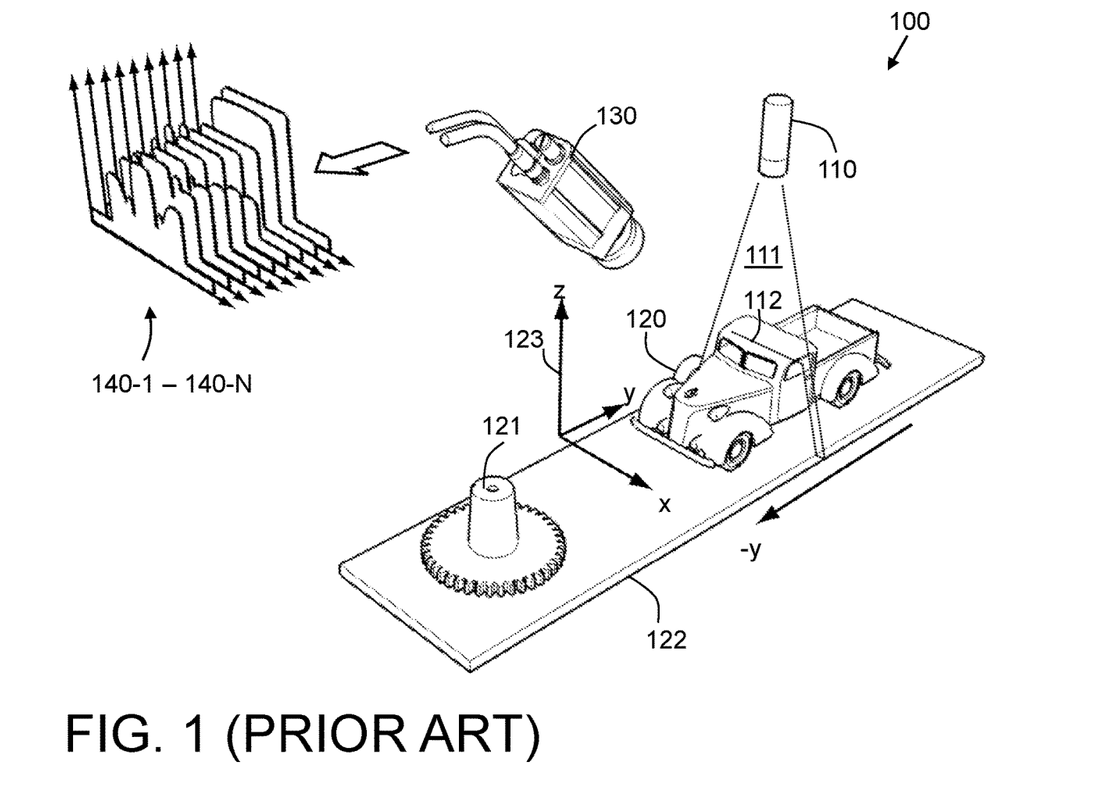
FIG. 1 schematically illustrates an example of a prior art imaging system.

FIG. 1 schematically illustrates an example of such type of imaging system as mentioned in the Background, namely an imaging system 100, for 3D machine vision, based on light triangulation for capturing information on 3D characteristics of target objects. The system 100 is in the figure shown in a situation of normal operation, i.e. typically after calibration has been performed and the system is thus calibrated. The system 100 is configured to perform light triangulation, here in the form of sheet of light triangulation as mentioned in the Background. The system 100 further comprises a light source 110, e.g. a laser, for illuminating objects to be imaged with a specific light pattern 111, in the figure exemplified and illustrated as a sheet of light. The light may, but not need to be, laser light. In the shown example, the target objects are exemplified by a first target object 120 in the form of a car and a second target object 121 in the form of a gear wheel construction. When the specific light pattern 111 is incident on an object, this corresponds to a projection of the specific light pattern 111 on the object, which may be viewed upon as the specific light pattern 111 intersects the object. For example, in the shown example, the specific light pattern 111 exemplified as the sheet of light, results in a light line 112 on the first object 120. The specific light pattern 111 is reflected by the object, more specifically by portions of the object at the intersection, i.e. at the light line 112 in the shown example. The measuring system 100 further comprises a camera 130 comprising an image sensor (not shown in FIG. 1). the camera and image sensor are arranged in relation to the light source 110 and the objects to be imaged so that the specific light pattern, when reflected by the objects, become incident light on the image sensor. The image sensor is an arrangement, typically implemented as a chip, for converting incident light to image data. Said portions of the object, which by reflection causes said incident light on the image sensor, may thereby be captured by the camera 130 and the image sensor, and corresponding image data may be produced and provided for further use. For example, in the shown example, the specific light pattern 111 will at the light line 112 on a portion of the car roof of the first object 120 be reflected towards the camera 130 and image sensor, which thereby may produce and provide image data with information about said portion of the car roof. With knowledge of the geometry of the measuring system 100, e.g. how image sensor coordinates relate to world coordinates, such as coordinates of a coordinate system 123, e.g. Cartesian, relevant for the object being imaged and its context, the image data may be converted to information on 3D characteristics, e.g. a 3D shape or profile, of the object being imaged in a suitable format. This knowledge is typically obtained from calibration as discussed in the Background. The information on said 3D characteristics, e.g. said 3D shape(s) or profile(s), may comprise data describing 3D characteristics in any suitable format.

By moving e.g. the light source 110 and/or the object to be imaged, such as the first object 120 or the second object 121, so that multiple portions of the object are illuminated and cause reflected light upon the image sensor, in practice typically by scanning the objects, image data describing a more complete 3D shape of the object may be produced, e.g. corresponding to multiple, consecutive, profiles of the object, such as the shown profile images 140-1-140-N of the first object 120, where each profile image shows a contour of the first object 120 where the specific light pattern 111 was reflected when the image sensor of the camera unit 130 sensed the light resulting in the profile image. As indicated in the figure, a conveyor belt 122 or similar may be used to move the objects through the specific light pattern 112, with the light source 110 and the camera unit 130 typically stationary, or the specific light pattern 111 and/or the camera 130 may be moved over the object, so that all portions of the object, or at least all portions facing the light source 110, are illuminated and the camera unit receives light reflected from all parts of the object desirable to image.

As understood from the above, an image provided by the camera unit 130 and the image sensor, e.g. of the first object 120, may correspond to any one of the profile images 140-1-140-N. Each position of the contour of the first object shown in any of the profile images 140-1-140-N are typically determined based on identification of intensity peaks in image data captured by the image sensor and on finding the positions of these intensity peaks.

Figure 2:
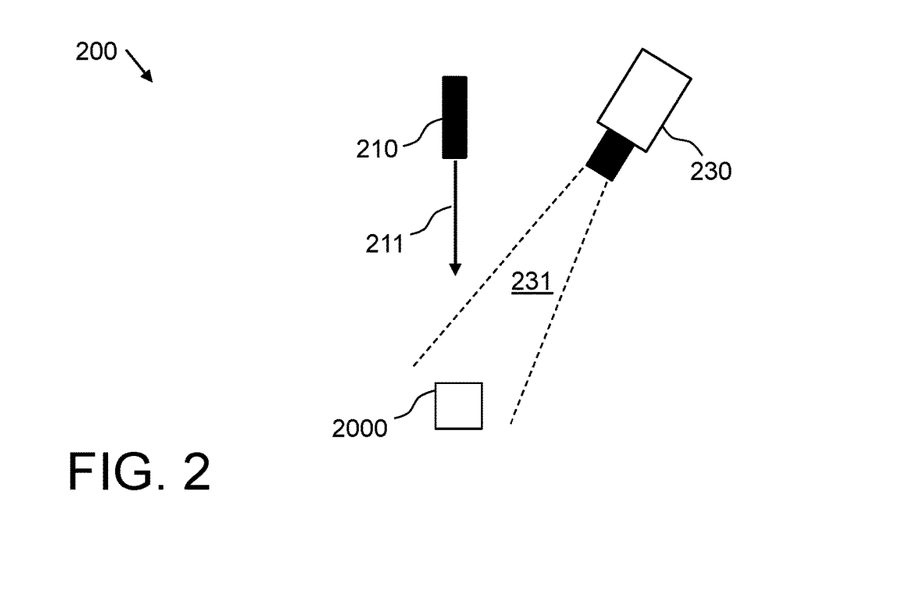
FIG. 2 schematically illustrates an exemplary imaging system according to some embodiments herein.

FIG. 2 schematically illustrates an exemplary imaging system 200, based on light triangulation for capturing information on 3D characteristics of one or more target objects, according to some embodiments herein. The shown system corresponds to a basic configuration with one light source 210 and one camera 230, arranged at certain positions respectively. The system 200 may correspond to the system 100 in FIG. 1, but in a state for calibration rather than for normal operation. Instead of target objects, such as the objects 120, 121 in FIG. 1, that the system during normal operation is targeting, i.e. imaging, there is in FIG. 2 instead a calibration target object 2000 for calibration of the system 200. During calibration it is thus instead the calibration target object 2000 that is targeted, i.e. imaged, by the imaging system 200. The calibration target object 2000, preferred properties and variations thereof will be described in further detail below. The calibration target object is located at least partly within field of view 231 of the camera 230. The light source 210 illuminates the calibration object with light 211 in the form of a specific light pattern, e.g. a sheet of light and/or laser line that is reflected by the calibration target object and the reflected light captured by the camera 230. Typically the calibration target object should be illuminated and images captured in a similar or same manner as target objects will be illuminated during normal operation, e.g. in a case as in FIG. 1 the calibration target object 2000 may move by means of a conveyor belt and thereby be completely illuminated by light from the light source. The light source 210 and camera 230 should be arranged as they will be during normal operation, such as arranged at the same positions. The calibration target object 2000 has, as understood, predefined and/or predetermined dimensions and properties, at least with respect to certain features used in and relevant for the calibration. Said dimensions and properties are for example in a certain world, or real, coordinate system and e.g. in metric units.

FIGS. 3A-D schematically exemplifies imaging systems 200a-d, respectively, according to some further embodiments herein. The shown systems may be considered representing different further configurations and/or setups of imaging systems based on light triangulation for capturing information on 3D characteristics of target objects and thus also different further configurations and/or setups for capturing information on 3D characteristics of calibration target objects for calibration of these imaging systems. As should be realized and as illustrated in the figures, it is desirable if one and the same calibration target object can support and be used in calibration of different configurations and/or setups used for operation of the imaging systems.

The imaging systems of the figures show different further configurations and/or setups comprising the camera 230, or in some figures two cameras, first and second cameras 230a, b, with field of views 231a, b, respectively, and comprising the light source 210, or in some figures two light sources, a first light source 210a and a second light source 210.

Figures 3A, 3B:
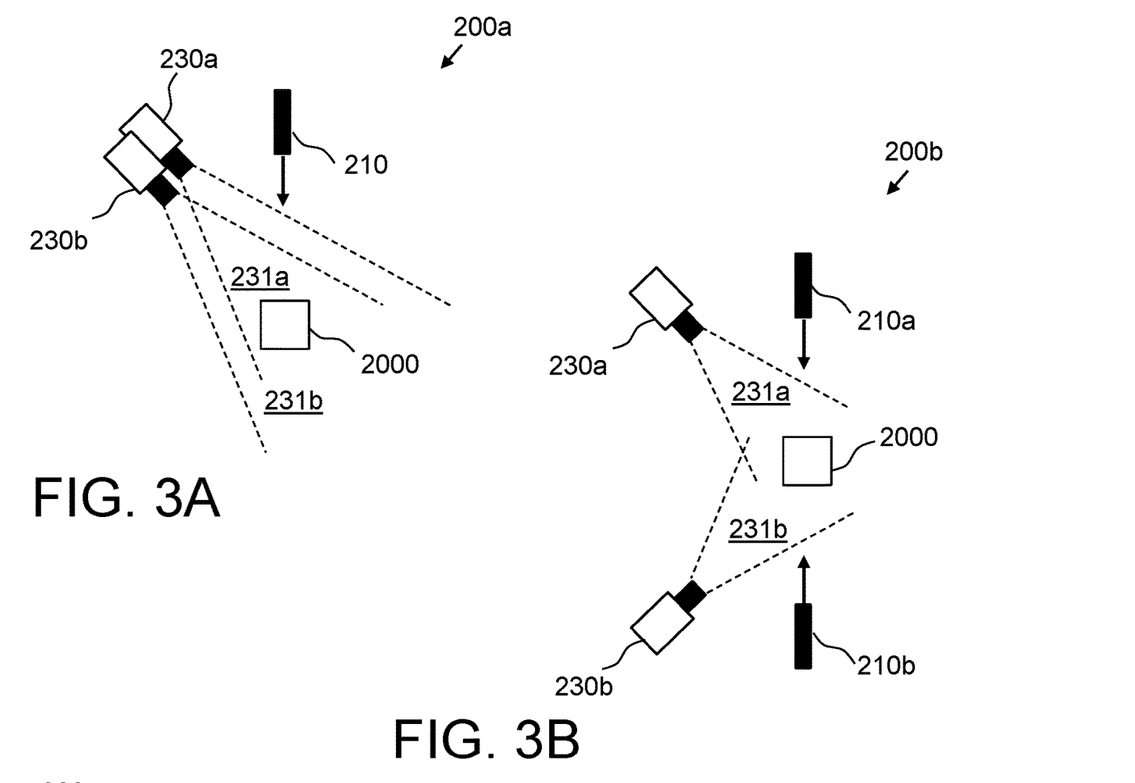
FIGS. 3A-D schematically exemplifies imaging systems, respectively, according to some further embodiments herein.

FIG. 3A is an example of a configuration with a "side by side" setup of cameras, here the two cameras 230a, b arranged side by side for capturing light reflected from an object, e.g. from the calibration object 2000. The object being illuminated by a single light source, here the light source 210 on the side viewed by the cameras.

FIG. 3B is an example of a configuration with a "top/bottom" setup of cameras, here the two cameras 230a, b arranged to view opposite sides of an object, here the calibration object 2000, and capturing of light reflected from respective side of the object. Each of said opposite sides of the object being illuminated by a respective light source, here 210a,b.

Figure 3C:
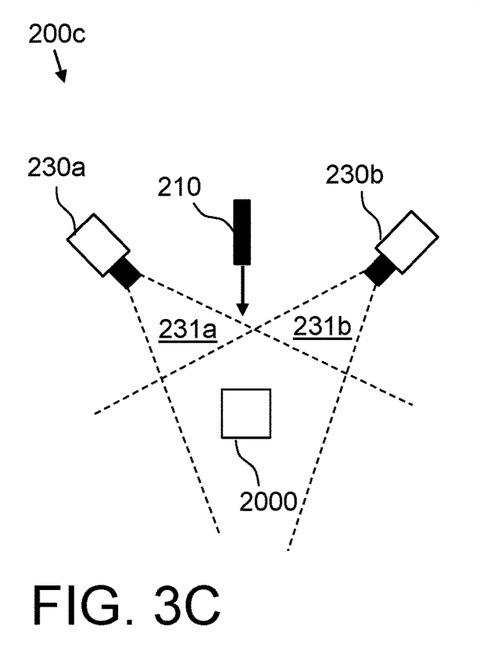

FIG. 3C is an example of a configuration with a "back/front" setup of cameras, here the two cameras 230a, b, arranged to view the same side of the object but from opposite directions, e.g. from a back and front direction, of an object, here the calibration object 2000. Said side of the object being illuminated by a single light source, here the light source 210.

Figure 3D:
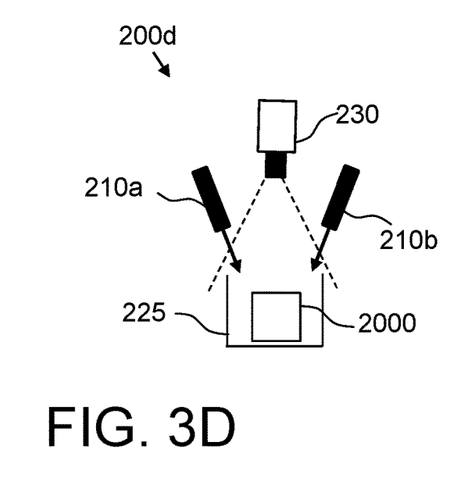

FIG. 3D is an example of a configuration with an "inside box" setup with a camera arranged to view into a box 225, or receptible, where the object is located. Two light sources, here 210a,b, are arranged to illuminate the inside of the box 225 and the object from different, e.g. opposite, directions.

Figure 4A:
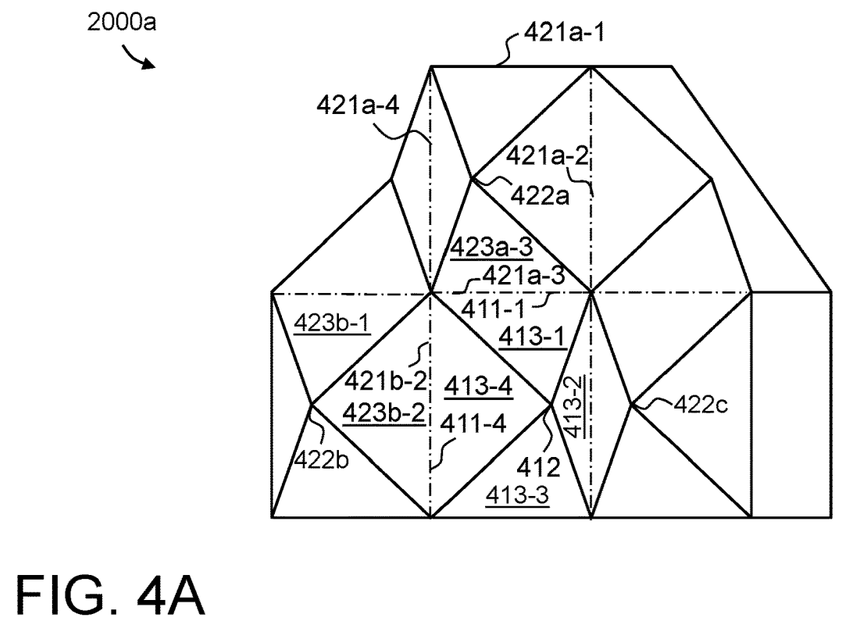
FIGS. 4A-D show different views of a calibration target object, comprised in some embodiments herein, and a first surface structure thereof.
Figure 4B:
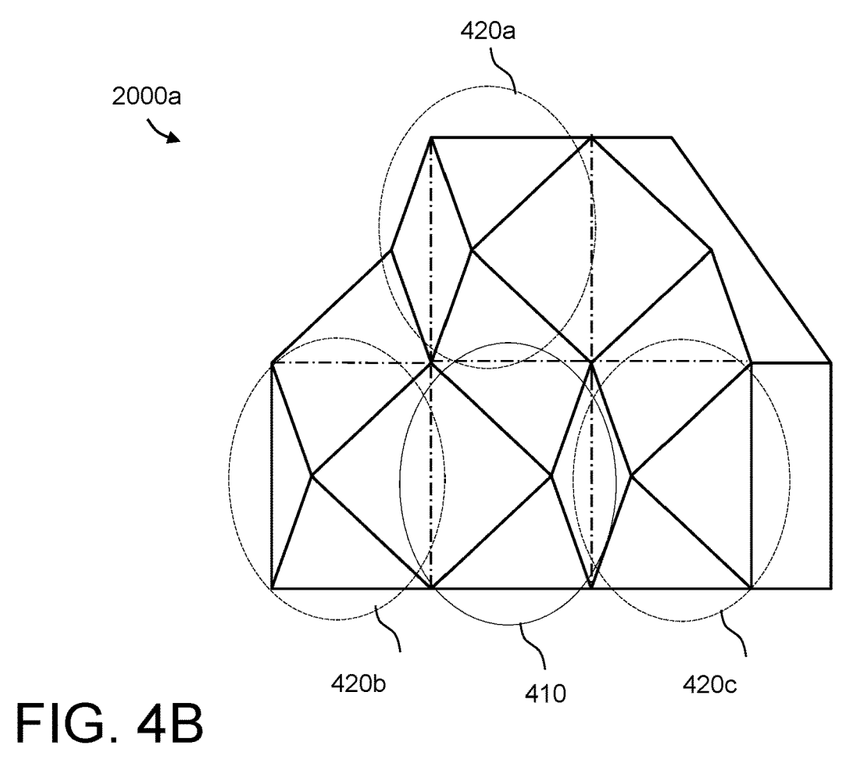
Figure 4C:
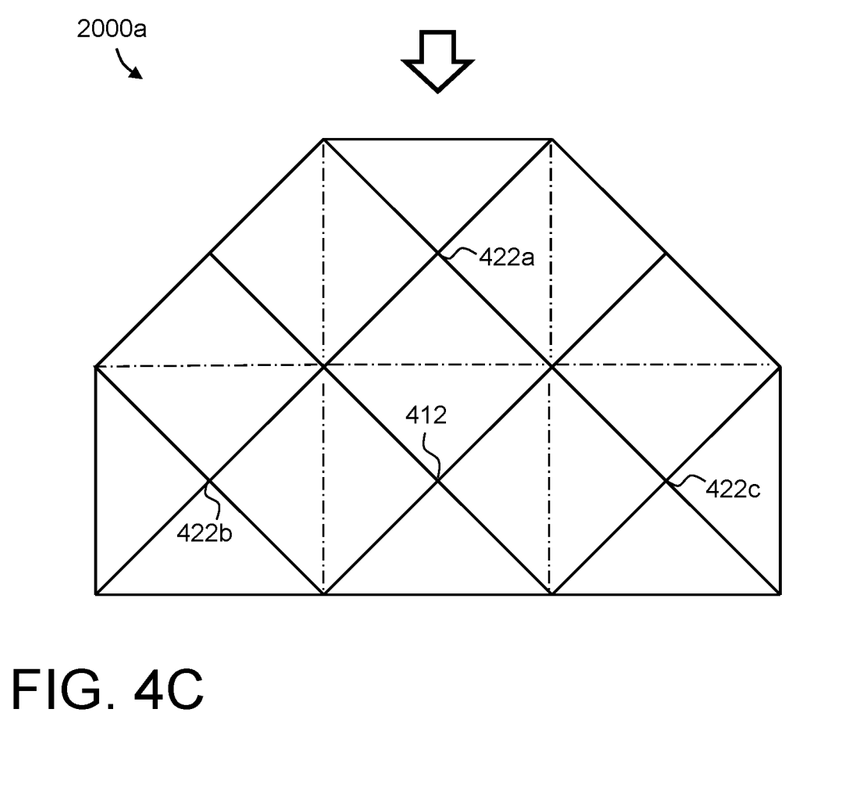
Figure 4D:
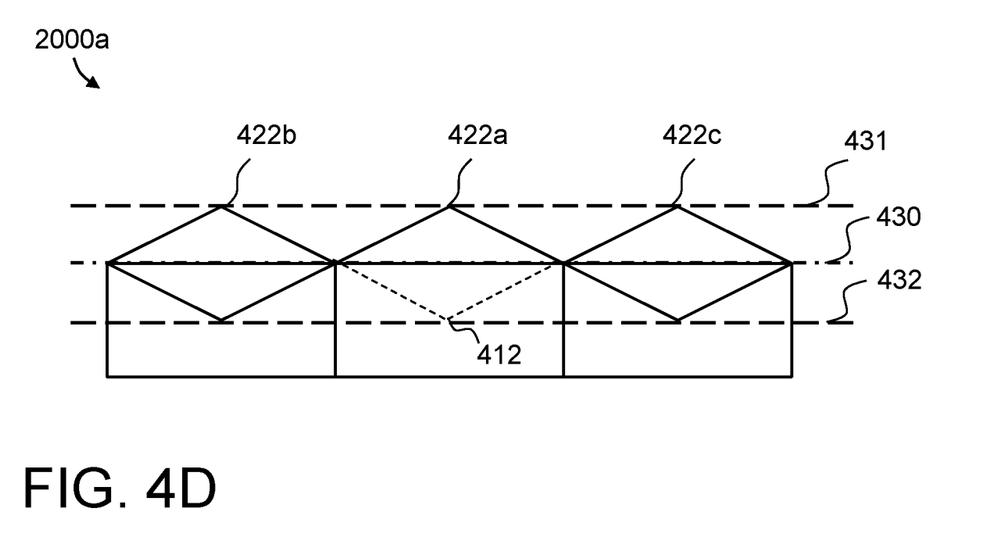
Figure 4E:
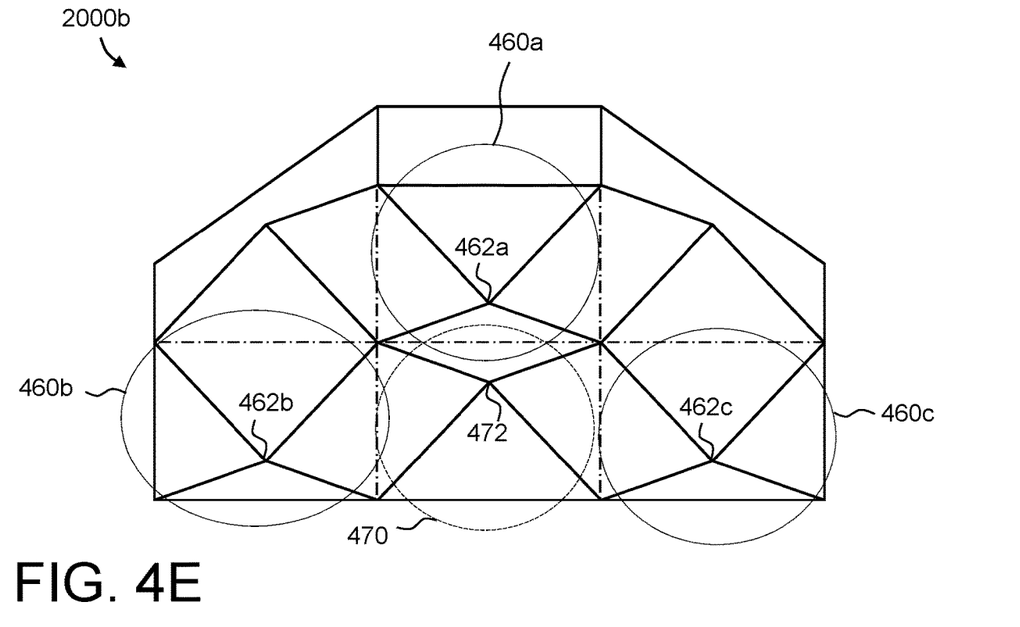
FIGS. 4E-F show views of two different calibration target objects, comprised in some embodiments herein, with different additional, second, surface structures.
Figure 4F:
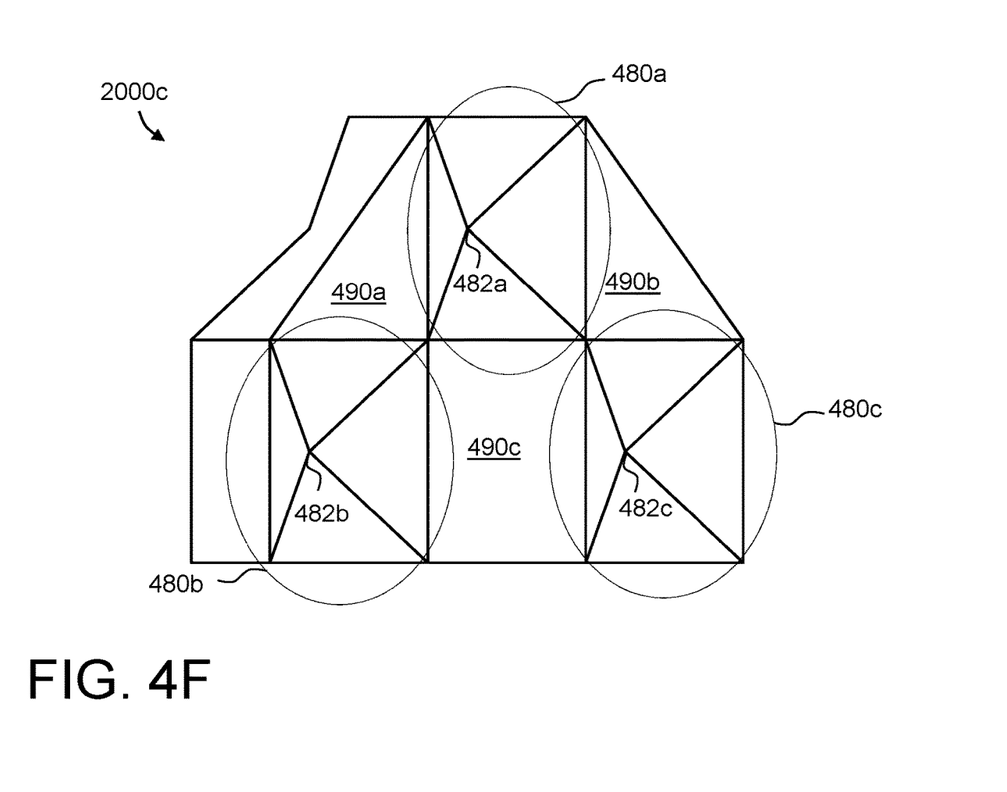
Figure 5A:
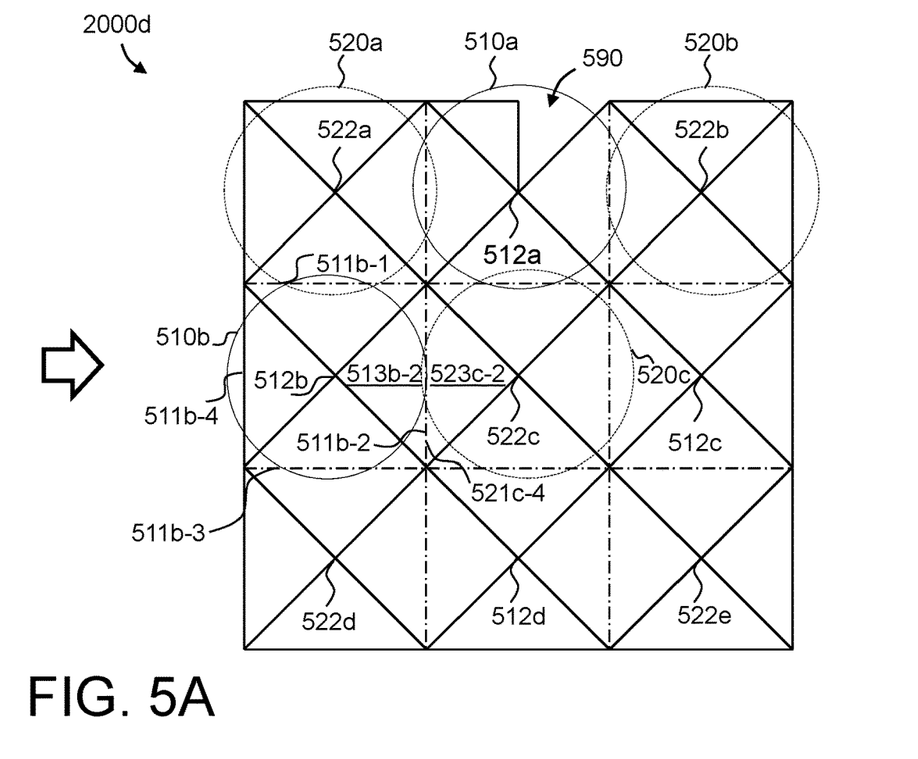
FIGS. 5A-B show different views of a further calibration target object, comprised in some embodiments herein, and surface structures thereof.
Figure 5B:
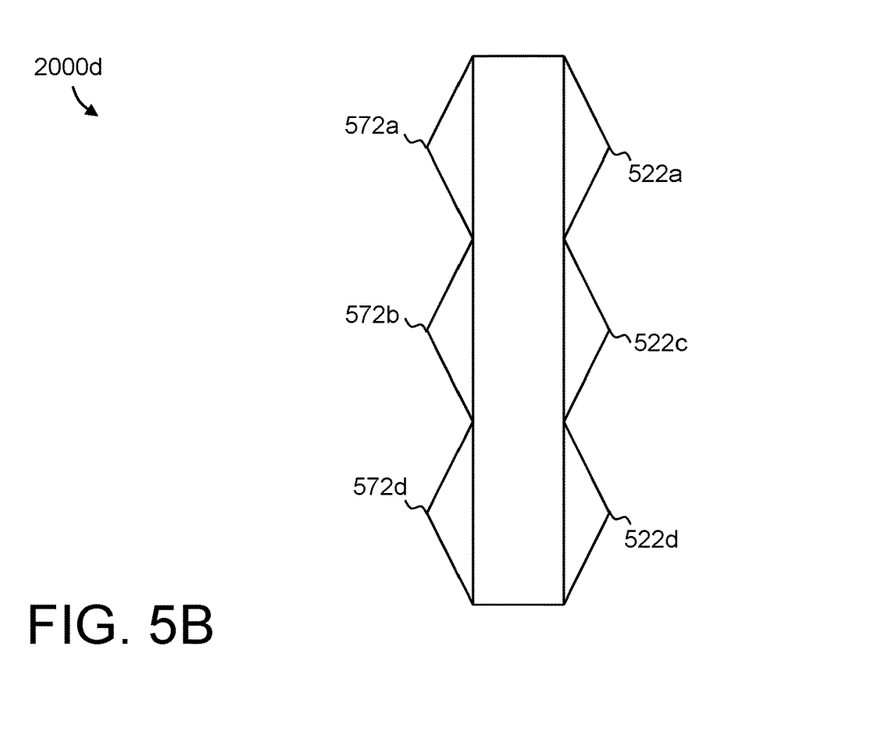
Figure 6A:
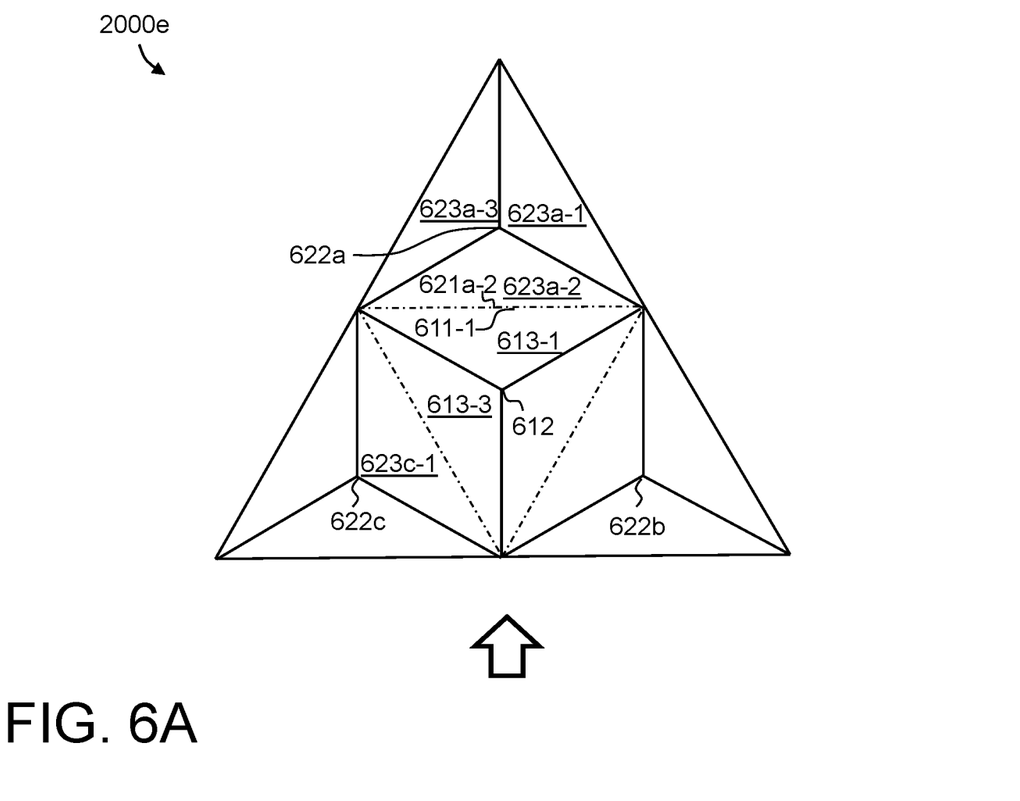
FIGS. 6A-C show different views of a yet another calibration target object, comprised in some embodiments herein, and a first surface structure thereof.
Figure 6B:
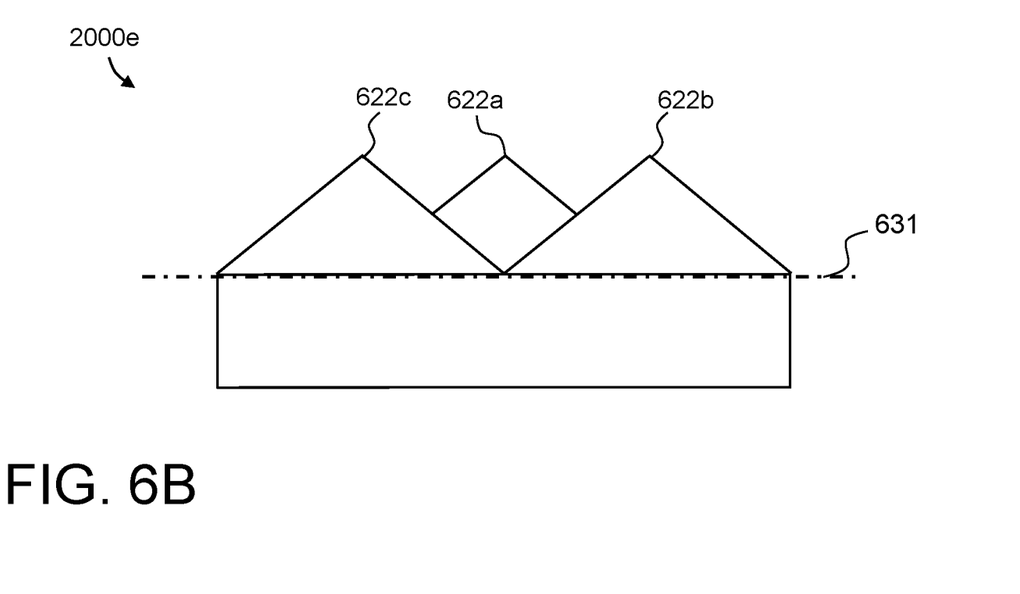
Figure 6C:
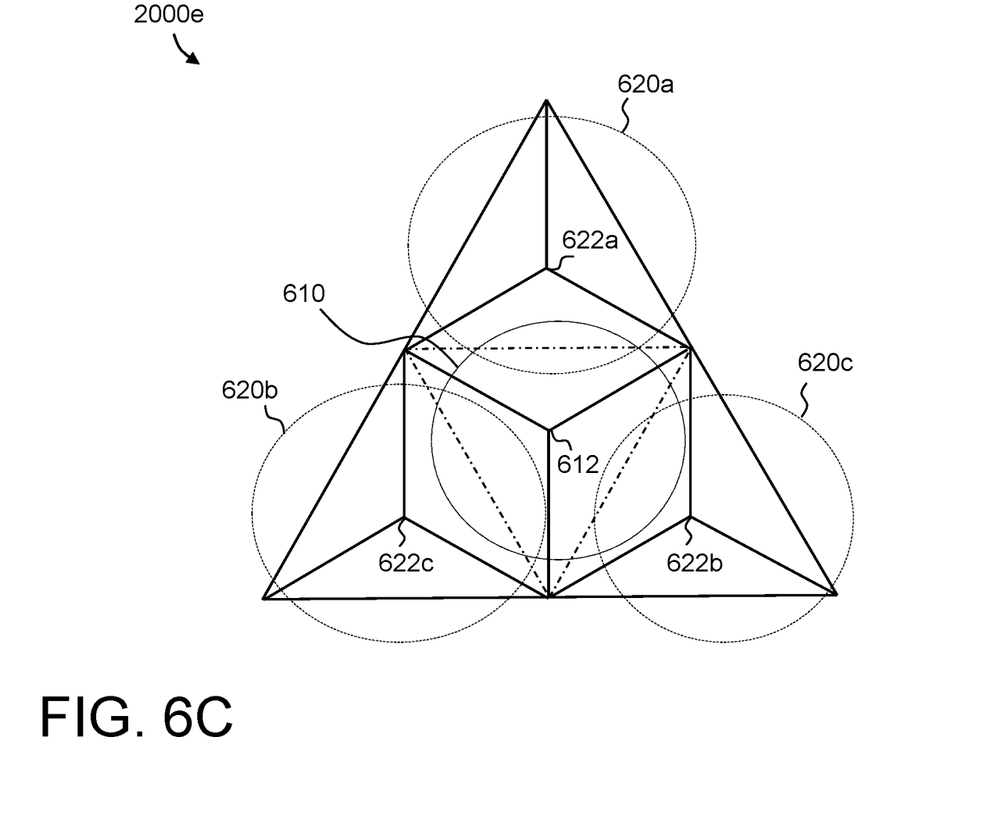

FIGS. 2, 3A-D show examples of imaging systems, e.g. 200, 200a-d, in states for calibration of the imaging system, which calibration is based on a calibration target object 2000, or simply calibration object, e.g. any one of 2000a-e as shown in FIGS. 4-6 discussed below. Each imaging system thus being one based on light triangulation for capturing information on 3D characteristics of one or more target objects by means of one or more cameras, e.g. 230, 230a-b, arranged at first one or more positions for detecting light reflected from said one or more target objects. As should be realized, it is implied that such image system also comprise one or more light sources, e.g. 210, 210a-b, arranged at certain one or more second positions respectively, for illumination of said one or more target objects with said light, i.e. the light that then is reflected and detected by the camera(s). The imaging system is during normal operation intended to target, i.e. image, said target object(s) and has thus been setup for this purpose.

The calibration target object 2000 is located, at least partly, within respective field of view, e.g. 231, of said camera(s), e.g. 230, so that the camera(s) are able to detect light reflected from one or more surface structures of the calibration target object 2000. The calibration target object 2000 is thus positioned so it can be imaged using the same setup of the imaging system as intended to be used during normal operation, e.g. with said camera(s) and/or light source(s) at the same positions and/or configured to be operated in the same way as during normal operation when said target objects(s) are imaged. As explained above, the conventional and typically required way to calibrate 3D imaging systems based on light triangulation is to calibrate using the same setup as during normal operation, with exception that a calibration target object is imaged instead of the target objects intended to be imaged during normal operation.

FIGS. 4A-D show different views of a calibration target object 2000a, comprised in some embodiments herein, and a first surface structure thereof. The calibration target object 2000a may be the calibration target object 2000 mentioned above. FIGS. 4A-B show the same perspective view of the calibration target object 2000a. FIG. 4C shows a top view of the calibration target object 2000a and FIG. 4D a side view thereof, from a point of view indicated by the large arrow in FIG. 4C.

The first surface structure of the calibration target object 2000a comprises one regular right pyramidal recess 410 and three regular right pyramids 420a-c. The pyramidal recess 410 and pyramids 420a-c have their respective bases in the same plane, which may be referred to as a base plane 430, and their respective apexes 412, 422a-c, at the same orthogonal distance from that same plane. This may be best illustrated in FIG. 4D where it can be seen that the apexes 422a-c of the pyramids 422a-c are in a first apex plane 431 and the apex 412 of the pyramidal recess 410 is in a second apex plane 432, both at the same distance from the base plane 430.

In the shown example, the pyramidal recess 410 and pyramids 420a-c have square bases with thus four sides each and thereby also four lateral faces per pyramidal recess and pyramid. Some lateral faces are indicated in the figure, e.g. lateral faces 423a-3, 423b-1, 423b-2 of pyramids 420a, 420b, and lateral faces 413-1, 413-2, 413-3, 413-4 of the pyramidal recess 410. As seen in the figure, the lateral faces of the respective regular right pyramids 420a-c correspond to the lateral faces of the regular right pyramidal recess 410.

The calibration target object 2000a and the first surface structure has three regular right pyramids and one regular right pyramidal recess. However, in general for embodiments herein, there shall be one or more regular right pyramids and one or more regular right pyramidal recesses, and at least three regular right pyramids or at least three regular right pyramidal recesses. In other words, there should be at least three of either the pyramids or pyramidal recesses. Further, in general for embodiments herein, the base of at least one of said regular right pyramidal recesses should share at least one side with the base of at least one of said regular right pyramids, such that each pair of lateral faces sharing side are located in a common plane. Each pair of lateral faces sharing side will thus appear as a single surface in a common plane and which surface in one end converges into the apex of a regular right pyramidal recess, and in the other, opposite, end converges into the apex of a regular right pyramid. For example, lateral faces 413-1 and 423a-3 are in a common plane and forms a surface that converges in the apexes 422a and 412. There will thus be a single surface that is relatively large, easy to detect and can be used to two find two apexes. Calibration of the imaging system is thereby facilitated and efficient calibration enabled. For example, compared to some prior art calibration target objects used in calibration of similar imaging systems, there are more surfaces that are effective and useful for finding position of apexes. An efficient and compact calibration target object is enabled and that can be used with many different setups of imaging systems.

In FIG. 4A the pyramidal recess 410 share sides of it base with all three pyramids 420a-c. Note that sides of the bases are indicated by a dotted and dashed line in FIGS. 4A and 4C. For example, side 411-1 of the base of pyramidal recess 410 is shared with the pyramid 420a, i.e. side 421a-3 of the base of the pyramid 420 is here the same as the side 411-1 of the base of the pyramidal recess 410.

Some further sides of bases of pyramids and the pyramidal recess are indicated in the figure, e.g. sides 421a-1, 421a-2 and 421a-4 of the base of the pyramid 420a, and shared sides 421b-2 and 411-4 of the bases of pyramid 420b and pyramidal recess 410, respectively.

As explained above, during calibration it is utilized known, such as predetermined, properties, features and dimensions of the calibration target object. It is therefore desirable to facilitate identification of features in image data from the calibration target object, i.e. in image data resulting from the imaging system when it was used to image the calibration target object. A planar surface, as the one formed by the lateral faces, is relatively easy to detect and identify and if it has known properties, e.g. it is known that it is planar and formed by a lateral faces of a pyramid and a pyramidal recess and that it converges in two apexes, the positions of the apexes can be determined. Further, since there is at least three pyramids or pyramidal recesses, positions of three apexes in the same plane can be determined and thereby can also the apex plane be determined, e.g. the first apex plane 431. Even if there is only one apex in another apex plane, e.g. the second apex plane 432, this plane can also be determined since it is known to be parallel to the first apex plane 431. It is realized that when e.g. said apexes and planes have been identified in the image data and in image sensor coordinates, the known properties, features and dimensions calibration target object, and corresponding positions in real world coordinates, can be utilized for the calibration.

Note that there is no need to actually identify the apexes as such directly in the image data from the calibration target object. The position of the apexes may be determined with greater accuracy by computations when the surface and its edges, known to converge in a apex, have been identified. In other words, the pyramids and pyramidal recesses, need not have physical apexes and it may thus not matter if an apex of a physical calibration target object is broken. In fact, there may be a calibration target object, comprised in some embodiment herein, with one or more of the pyramids and pyramidal recessed "cut off", i.e. may be in the form of right frustrum(s) and/or right frustrum recess(es). However, the lateral faces should of course still share base sides as described above etc. That said, it may nevertheless be preferred to form the pyramids and pyramidal recesses of calibration target objects according to embodiments herein with physical apexes, since this means that there is more surface available for detection.

Even though it is beneficial already with a single pair of lateral faces sharing side as described above, i.e. that appear as a single surface in a common plane and that converges in apexes in opposite ends of the surface, the effect is improved if there are more such surfaces, e.g. as is the case for the calibration target object 2000a. Preferably there should be at least three apexes in the same plane, each part of a respective single surface converging in an apex also in opposite end of the surface.

Hence, in some embodiments, the base of at least one of regular right pyramidal recesses, e.g. 410, shares at least two sides with the bases of at least two of regular right pyramids, e.g. two of 420a-c, such that each pair of lateral faces, e.g. 413-1 and 423a-3, sharing side are located in a common plane. In some embodiments, which e.g. may correspond to a surface structure that is inverted to the one shown in FIGS. 4A-D, the base of at least one of regular right pyramids shares at least two sides with the bases of at least two of regular right pyramidal recesses, such that each pair of lateral faces sharing side are located in a common plane.

Furthermore, in some embodiments, the base of at least one of said regular right pyramidal recesses, e.g. 410, shares at least three sides with the bases of at least three of said regular right pyramids, e.g. 420*a-c*, such that each pair of lateral faces sharing side are located in a common plane. In some embodiments, which also here may correspond to a surface structure that is inverted to the one shown in FIGS. 4A-D, the base of at least one of regular right pyramids shares at least three sides with the bases of at least three of regular right pyramidal recesses, such that each pair of lateral faces sharing side are located in a common plane.

The regular right pyramids and regular right pyramidal recess of the calibration target objects 2000*a-c* discussed above have quadratic bases, which is advantageous for several reasons. For example can such calibration target object be easy to produce, it enables a dense and effective calibration target object with many useful surfaces, enables and facilitates calibration of many different imaging system setups, it provides relatively large surfaces for identification, provides a simple 90-degree relation between the sides, and even without one lateral surface of a pyramid or pyramidal recess, e.g. not sufficiently captured by image data, there are still three others surfaces that may be used to find an intersection point and thus an apex. Hence, here a quadratic base in general facilitates calibration.

However, also other bases are possible, e.g. a triangular bases, which is the smallest possible base geometry of a pyramid and that can result in an apex. Such pyramids and pyramidal recesses also enable a dense calibration object with relatively large but few surfaces for detection. Also a smallest possible calibration object may be based on pyramids and pyramidal recesses with triangular base.

Hence, in some embodiments, the calibration target object has one or more regular right pyramidal recesses and one or more regular right pyramids, that have triangular bases or quadratic bases.

To be able to keep simple relations and provide a dense calibration object with as many useful surfaces as possible, each surface structure, and e.g. all surface structures of a single calibration object, should be based on the same type of pyramidal base, and preferably of same size, e.g. as in the shown examples. However, mixed surface structures are not generally excluded for embodiments herein, although typically associated with some drawbacks.

Moreover, also other base geometries than quadratic and triangular are possible, e.g. hexagonal, which also enable a dense surface structure where e.g. every side of the base of a pyramidal recess may be shared with a pyramid. Some other geometries do not enable this. However, generally may pyramidal bases with more than four sides result in an undesirably complex calibration object with unnecessary many lateral faces, and where the surface of each lateral face becomes increasingly smaller with the number of sides. Also, the less angular difference between the lateral faces of the same pyramid or pyramidal recess, the more difficult it may become to identify them as separate ones in the image data, and the angular difference decreases with the number of sides of the pyramidal base.

In some embodiments, it may be preferred that the pyramids and pyramidal recesses are obtuse, e.g. in the case of a quadratic base and with reference to FIGS. 4A-D, that respective apex, e.g. 412, 422*a-c*, of the regular right pyramidal recess(es), e.g. 410, and the regular right pyramid(s), e.g. 420*a-c*, has an apex angle of at least 90 degrees. As used herein, for a pyramid with quadratic base, the apex angle is the angle of intersection between the planes of opposite lateral faces. For some situations and imaging system setups, obtuse pyramids and pyramidal recesses reduces the risk of occlusion, that a surface to me imaged and detected is obstructed or hidden, or that light is reflected in undesirable directions. However, there may be some situations where acute pyramids and pyramidal recess are desirable, e.g. for certain image system setups. Smaller apex angles have some benefits that sometimes are desirable, such as higher resolution between pyramid apexes and pyramidal recess apexes, and that smaller calibration target objects can be accomplished.

In some embodiments, there are is one or more additional surface structures, e.g. in addition to the one shown in FIGS. 4A-D, such as on the opposite side of the object, so that the object can be used with even more different imaging system setups.

Hence, in some embodiments, there is a calibration target object that in addition to a first surface structure as discussed above, have an additional, second surface structure located on opposite side of the calibration target object compared to location of the first surface structure. Said second surface structure also comprises one or more regular right pyramidal recesses and/or one or more regular right pyramids, with their respective bases in the same plane and their respective apexes at the same orthogonal distance from that same plane. There should be at least three regular right pyramids or at least three regular right pyramidal recesses. As explained below, this enables calibration for more imaging system setups than possible with a single side surface structure and more flexible usage of the calibration target object.

FIGS. 4E-F show views of two different calibration target objects, comprised in some embodiments herein, with different additional, second, surface structures. Each of the shown second surface structures may be located on another, preferably opposite, side of a calibration target object with a first side and surface structure that may be as shown in FIGS. 4A-D for the calibration target object 2000*a*.

FIG. 4E shows a perspective view of a calibration target object 2000*b* and second surface structure thereof. On the other, not shown side, there may be such surface structure as shown in FIGS. 4A-D for the calibration target object 2000*a*. It may be noted that the shown second surface structure in FIG. 4E is an inverted form of the first surface structure shown in FIGS. 4A-D, e.g. where each pyramid corresponds to a pyramidal recess, and vice versa. Or in other words, the first and second surface structures are mirroring each other. For example, the pyramidal recess 410 with apex 412 of the first surface structure corresponds to a regular right pyramid 472 with apex 472 of the second surface structure in FIG. 4E. There are also regular pyramidal recesses 460*a-c* with apexes 462*a-c*, respectively. Such inverted surface structures enables provision of a material efficient calibration target object and versatility in manufacturing thereof. Hence, in some embodiments, said second surface structure mirrors said first surface structure, and vice versa, such that each regular right pyramidal recess, e.g. 460*a-c*, is opposing a respective regular right pyramid, e.g. 420*a-c*, and vice versa.

FIG. 4F shows a perspective view a calibration target object 2000*c* and second surface structure thereof. On the other, not shown side, there may be such first surface structure as shown in FIGS. 4A-D for the calibration target object 2000*a*. It may be noted that the shown second surface structure in FIG. 4F only has regular right pyramidal recesses 480*a-c* and no pyramids. Except for the recesses, the shown surface structure has flat or planar surfaces 490*a-c* in the plane of the base of the pyramidal recesses.

Although there thus are no lateral face surfaces here that converges in two apexes, it may still be preferred, and sort of a tradeoff, with the more planar second surface structure, if the other side has such first surface structure as in FIGS. 4A-D. This since the more planar surface structure shown in FIG. 4E allows for a more stable placement of the calibration target object when e.g. only the first surface structure, such as shown in FIG. 4D is to be used, which most often may be the case. The calibration target object 2000c provides versatility since the second surface structure with the planar surfaces is present and can be used for calibration if it is desirable or needed in another situation, such as for some setups with multiple cameras. In such situation the calibration target object may be placed edgeways so that both surface structures are within FOVs and can be imaged.

FIGS. 5A-B show different views of a calibration target object 2000d, comprised in some embodiments herein, and a first surface structure thereof. In FIG. 5A there is shown a top view and in FIG. 5B a side view from a point of view indicated by the large arrow in FIG. 5A. The first surface structure is shown in FIG. 5A and may be similar as the first surface structure of the calibration target object 2000a shown in and discussed above in connection with FIGS. 4A-D, but here the surface structure is somewhat extended and the shape of the calibration target object 200d quadratic with 3×3 alternating pyramids and pyramidal recesses. For example, there are regular right pyramids 520a-c and regular right pyramidal recesses 510a-b. The shown regular right pyramids have apexes 522a-e and the regular right pyramidal recesses have apexes 512a-d. Some lateral faces are also indicated in the figure, e.g. lateral face 513-2 of pyramidal recess 510b and lateral face 523c-2 of pyramid 520c, which share base side so that a side 511b-2 is the same as a side 521c-4. The calibration target object has, as seen in FIG. 5B, also a second surface structure on the opposite side, which here is one that mirrors said first surface structure as explained above.

A further difference compared to the calibration target object 2000a is that there is a triangular shaped recess 590 in an edge of and through the calibration target object 2000d. The recess is an example of an asymmetrically shaped feature and is visible from opposite sides of the calibration target object 2000d.

In some embodiments, and in particular such with a calibration target object that else is symmetrical, the calibration target object is provided with an asymmetrical feature, e.g. the triangular recess 590, such that it, based on image data of the calibration target object, e.g. 2000d, can be identified orientation of the calibration target object and whether an image of the calibration target object is mirrored or not. The asymmetrical feature may be an asymmetrically shaped recess in an edge of and through the calibration target object so that that the asymmetrically shaped recess is visible from opposite sides of the calibration target object. The asymmetrical feature is e.g. a right angled triangular shaped through hole, such as shown in the figure. Such feature is easy to accomplish and to identify, plus possible to provide so that it causes no or low interference with the rest of the surface structure, e.g. the lateral faces and surfaces for detection.

However, a realized, also other asymmetrical features are possible, although a recess also is simple, robust and easy to accomplish. I any case, the asymmetrical feature should be visible at least when the first surface structure is imaged by the camera(s) and should thus typically be located on at least the same side of the calibration target object as the first surface structure, preferably also visible on a side of a second surface structure when such is present. Said feature enables identification of orientation of the calibration target object and whether an image of the calibration target object is mirrored or not, even if the calibration target object and said surface structures are made symmetrical. Except from the asymmetrical feature, it may be advantageous with calibration target objects that else are symmetrical, which may facilitate arranging the calibration target object suitably within the FOV of the cameras.

FIGS. 6A-C shows a calibration target object 2000e that is an example of a calibration target object and surface structure similar as described above for FIGS. 4A-D but with triangular bases instead of quadratic bases.

FIG. 6A shows a top view of the calibration target object 2000e and FIG. 6B a side view thereof, from a point of view indicated by the large arrow in FIG. 6A. FIG. 6C shows the view of the calibration target object 2000e as in FIG. 4A but with less and other reference numerals.

The shown surface structure of the calibration target object 2000e comprises one regular right pyramidal recess 610 and three regular right pyramids 620a-c. The pyramidal recess 610 and pyramids 620a-c have their respective bases in the same plane, a base plane 630, and their respective apexes 612, 622a-c, at the same orthogonal distance from that plane.

In the shown example, the pyramidal recess 610 and pyramids 620a-c have triangular bases with thus three sides each and thereby also three lateral faces per pyramidal recess and pyramid. Some lateral faces are indicated in the figure, e.g. lateral faces 623a-1, 623a-2, 623a-3 of pyramid 620a, lateral faces 613-1, 613-2, 613-3 of the pyramidal recess 610, and also lateral face 623c-1 of pyramid 620c. As seen in the figure, the lateral faces of the respective regular right pyramids 620a-c correspond to the lateral faces of the regular right pyramidal recess 610.

The calibration target object 2000e, specifically the surface structure thereof, has three regular right pyramids and one regular right pyramidal recess. The base of the regular right pyramidal recess 610 share respective side with the bases of the regular right pyramids 620a-c, such that each pair of lateral faces sharing side are located in a common plane. For example, the recess 610 share its base side 611-1 with the base side 621a-2 of pyramid 620a, and the lateral faces 613-1 and 623a-2 are in a common plane.

These lateral faces thus appear as a single surface in the common plane and which surface in one end converges into the apex 612 and in the other, opposite, end converges into the apex 622a.

The material that the calibration target objects in embodiments herein are made of may e.g. be any conventional material used for calibration target object for similar or same use, with or without a separate surface layer of different material, e.g. a coating. The material and/or surface layer should thus typically be such materials that produces diffuse reflections and it is generally preferred to use light over dark colored surfaces. Durable materials and that are not easily damaged, e.g. in case of dropping of the object, may preferably be used. For example, plastic materials may be used and/or metals, such as aluminum, in addition to many other materials. Manufacturing methods may include e.g. casting, moulding, milling, 3D-printing.

It should be noted that any enumerating terminology used herein, such as first, second, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that something is configured to, or adapted to, e.g. by means of software or hardware configuration, to perform one or more actions.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. An imaging system based on light triangulation for capturing information on three dimensional characteristics of a target object by means of one or more cameras arranged at first one or more positions for detecting light reflected from said target object, said system comprising said one or more cameras at said first positions and a calibration target object within respective field of view of said cameras so that the cameras are able to detect light reflected from one or more surface structures of the calibration target object, said one or more surface structures having a first surface structure comprising one or more regular right pyramidal recesses and one or more regular right pyramids, with their respective bases in the same plane and their respective apexes at the same orthogonal distance from that same plane, where the lateral faces of the respective regular right pyramids correspond to the lateral faces of the regular right pyramidal recesses, there being at least three regular right pyramids or at least three regular right pyramidal recesses, wherein the base of at least one of said regular right pyramidal recesses shares at least one side with the base of at least one of said regular right pyramids, such that each pair of lateral faces sharing side are located in a common plane.

2. The imaging system as claimed in claim 1, wherein the base of at least one of said regular right pyramidal recesses shares at least two sides with the bases of at least two of said regular right pyramids, or the base of at least one of said regular right pyramids shares at least two sides with the bases of at least two of said regular right pyramidal recesses, such each pair of lateral faces sharing side are located in a common plane.

3. The imaging system as claimed in claim 1, wherein the base of at least one of said regular right pyramidal recesses shares at least three sides with the bases of at least three of said regular right pyramids, or the base of at least one of said regular right pyramids shares at least three sides with the bases of at least three of said regular right pyramidal recesses, such each pair of lateral faces sharing side are located in a common plane.

4. The imaging system as claimed claim 1, wherein said one or more regular right pyramidal recesses and said one or more regular right pyramids have triangular bases or quadratic bases.

5. The imaging system as claimed in claim 1, wherein said one or more surface structures have an additional, second surface structure located on opposite side of the calibration target object compared to location of the first surface structure, said second surface structure also comprising one or more regular right pyramidal recesses and/or one or more regular right pyramids, with their respective bases in the same plane and their respective apexes at the same orthogonal distance from that same plane, there being at least three regular right pyramids or at least three regular right pyramidal recesses.

6. The imaging system as claimed in claim 5, wherein said second surface structure mirrors said first surface structure, and vice versa, such that each regular right pyramidal recess is opposing a respective regular right pyramid and vice versa.

7. The imaging system as claimed in claim 1, wherein the calibration target object is provided with an asymmetrical feature such that it, based on image data of the calibration target object captured by any one of said cameras, can be identified orientation of the calibration target object and whether an image of the calibration target object is mirrored or not.

8. The imaging system as claimed in claim 7, wherein said asymmetrical feature is an asymmetrically shaped recess in an edge of and through the calibration target object so that that the asymmetrically shaped recess is visible from opposite sides of the calibration target object.

\* \* \* \* \*